May 18, 1943.   D. C. DRILL   2,319,666
MEANS FOR AND METHOD OF MANUFACTURING
MINERAL WOOL FELTED MATERIAL
Filed Feb. 14, 1941   4 Sheets-Sheet 1
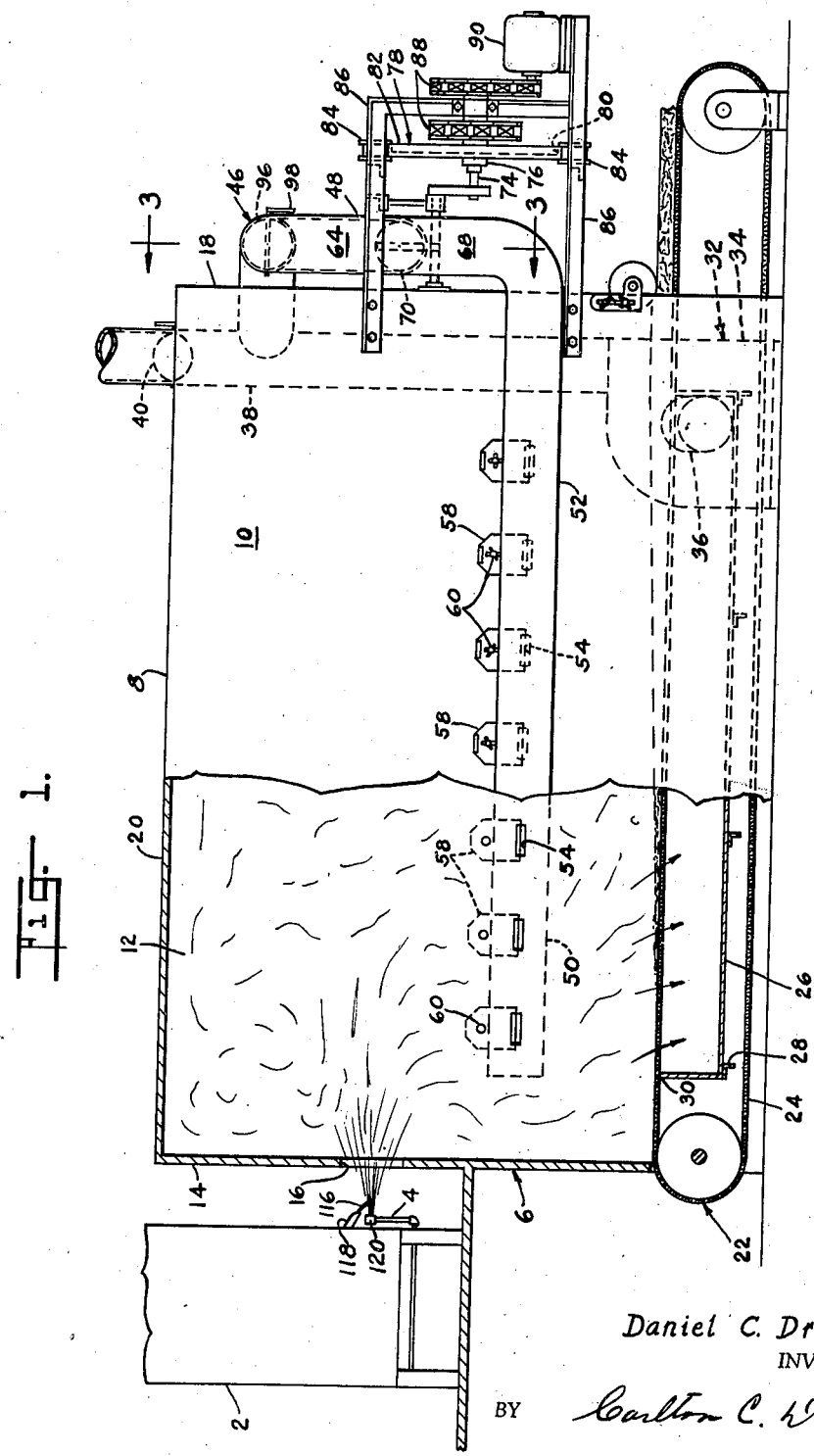
Daniel C. Drill
INVENTOR.
BY Carlton C. Davis
ATTORNEY.

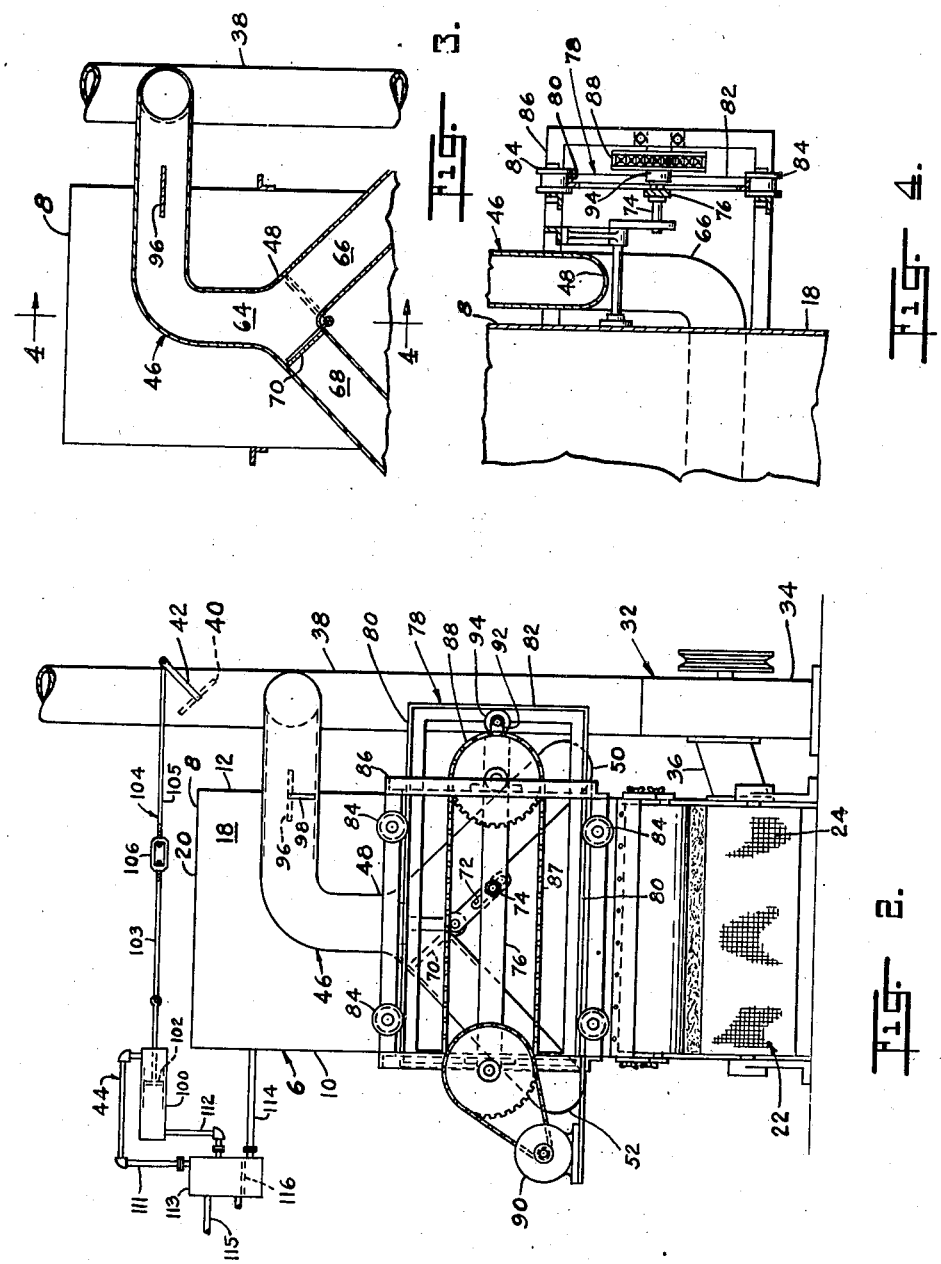

May 18, 1943.  D. C. DRILL  2,319,666
MEANS FOR AND METHOD OF MANUFACTURING
MINERAL WOOL FELTED MATERIAL
Filed Feb. 14, 1941  4 Sheets-Sheet 3
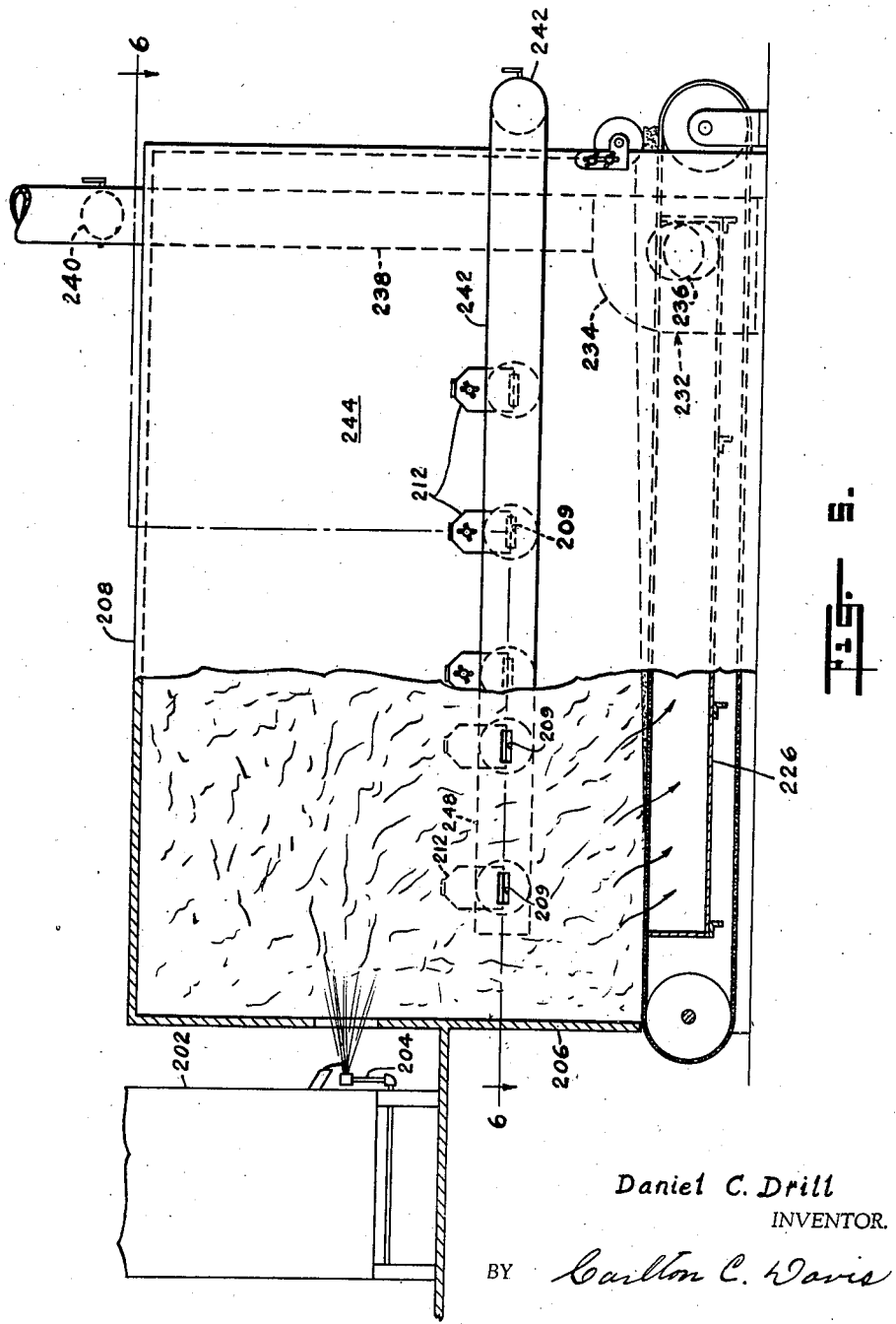
Daniel C. Drill
INVENTOR.
BY Carlton C. Davis
ATTORNEY.

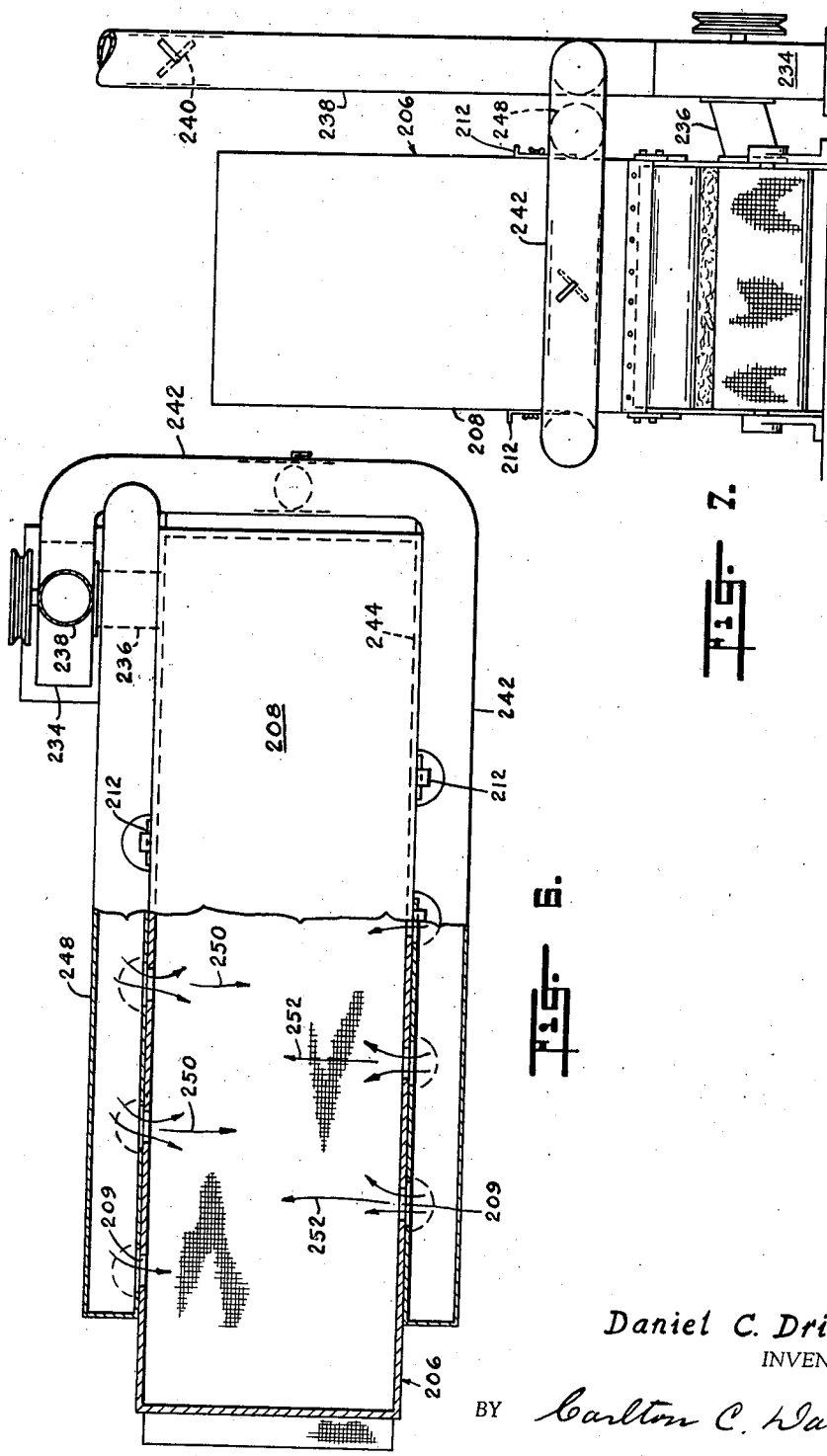

Patented May 18, 1943

2,319,666

UNITED STATES PATENT OFFICE 2,319,666

MEANS FOR AND METHOD OF MANUFACTURING MINERAL WOOL FELTED MATERIALS

Daniel C. Drill, Wabash, Ind., assignor to American Rock Wool Corp., Wabash, Ind., a corporation of Indiana Application February 14, 1941, Serial No. 378,976

10 Claims. (Cl. 19—156)

This invention generally relates to means for and methods of manufacturing mineral wool batts. It also relates to a mineral wool settling chamber which is especially adapted to provide a mineral wool felted product, all portions of which have substantially the same density.

A major object of this invention is the provision of methods and means whereby strips, blanket sections, or boards having uniform density, resilience and flexibility may be formed in a settling chamber on the floor of which the falling fibers are distributed and deposited. This invention deals with substantially the same problem and has substantially the same objects as does the invention disclosed in my U. S. Letters Patent, No. 2,103,769, for an improved Method of and means for forming felted strips, which was issued December 28, 1937, but it provides different methods and apparatus whereby the mineral wool fibers may be evenly deposited on the floor or conveyor of the blow chamber. My above mentioned patent discloses the use of swingably mounted boards or "curtains" within the walls of a blow chamber, but the method and apparatus of my present invention has the advantage of obtaining an even distribution of the fibers on the conveyor without using any moving parts within the blow chamber.

In the conventional method of manufacturing mineral wool, a suitable molten stream of lava is shredded into mineral wool fibers by a steam or air blast. This blast projects the newly formed fibers into an adjacent blow chamber in which the fibers settle from suspension on a continuously movable conveyor upon which they become felted together to form a wide elongated strip of mineral wool which is continuously carried out of the front end of the settling chamber by the conveyor. After being removed from the blow chamber, this strip is thereafter longitudinally slitted into a plurality of strips which are then slitted transversely to provide a plurality of rows of heat insulating batts, acoustical pads or wall boards (hereinafter termed batts).

For the purpose of obtaining a more economical production, the conveyor which forms the floor of the blow chamber is often made more than three or four times as wide as the finished product in order that three or four parallel rows of the batts may be simultaneously produced by the apparatus.

This is an extremely economical method of manufacturing these batts, but it has one very serious defect in that the elongated strip is ordinarily formed higher and thicker in its outside portions than it is in its mid-section. The entire blanket is, of course, afterward compacted by a compacting roller or belt which compacts all portions of the felted strip to the same thickness and when these strips are slitted into batts they have substantially the same size, shape, and appearance. Most unfortunately, however, the batts cut from the mid-portion of the felted strip almost invariably have a lower density than do the batts cut from the outside portions of the strip.

Now the desired physical characteristics of the batt (for instance its strength, its heat insulating and acoustical characteristic) are largely dependent upon the density and thickness of the felted product and when this density is larger or smaller than the most efficient density of the specific type of batt being made, these characteristics are less than they should be.

In actual production it is possible to cut from an elongated blanket having exactly the desired average density (say 7 pounds per cubic foot), batts from the outside portions weighing 9 pounds per cubic foot and batts from the inside portion weighing only 3 pounds per cubic foot.

Substantially the same conditions are obtained when the conveyor and elongated blanket formed thereon is just wide enough to provide one strip or one roll of batts, but, of course, the inner portions of these batts have an appreciably lower density than do their outer portions. This uneven density is chiefly due to the fact that the fibers are rapidly swirled around in the blow chamber until they hit the walls of the blow chamber where the fibers lose their velocity and tend to fall down adjacent the walls of the blow chamber. As the blow chambers are usually quite long with respect to their width, a much greater proportion of the fibers in the blow chamber fall near the outside edges of the forming strip. This is, of course, highly undesirable.

It is the major object of this invention to overcome this above mentioned defect in the manufacture of mineral wool batts and to provide means and methods to commercially produce batts, all parts of which have substantially the same density.

The other and further purposes of my invention will become apparent from the following description and claims, and the accompanying drawings in which;

Figure 1 is a partly side and partly sectional view of the preferred form of the apparatus of my invention;

Figure 2 is an end view of the apparatus shown in Figure 1;

Figure 3 is a section taken along the lines 3—3 of Figure 1;

Figure 4 is a section taken along the lines 4—4 of Figure 3;

Figure 5 is a partly side and partly sectional view of the modified form of my invention;

Figure 6 is a view taken along the lines 6—6 of Figure 5 and

Figure 7 is an elevational view of the settling chamber shown in Figure 5.

In carrying out my invention, I make use of a melting cupola or furnace 2, a shredding means 4, and an improved settling or blow chamber apparatus 6 which may be of any suitable construction adapted to serve the purpose of this invention.

The preferred form shown on the accompanying drawings includes a housing 8 having side walls 10 and 12, a rear wall 14 having an open blast inlet portion 16, a front wall 18, a roof 20 and a preferably movable floor or conveyor apparatus 22. This conveyor apparatus includes an endless foraminous conveyor belt 24 which may be mounted in any well known manner and is preferably provided with any suitable variable speed drive means such as for instance a motor driven infinitely variable speed reduction drive mechanism (not shown). Between the inner sides of the belt 24 I have mounted a suction pan 26 which may be supported in any suitable manner by cross bars 28 which are carried on the frame members (not shown) on the side walls 10 and 12.

This suction pan 26 is open at its top portion 30 which is closely adjacent to the upper inner side of the foraminous belt 24.

This suction pan forms part of a gas blower construction 32, which is provided for the purpose of withdrawing the gases and vapors from the interior of the blow chamber downwardly through the openings in the belt 24 in a manner adapted to entrap the fibers falling down from suspension on this conveyor belt in the form of an elongated blanket or strip and returning a portion of the withdrawn gases for a purpose hereinafter described.

This blower construction preferably includes a centrifugal blower 34, an intake conduit 36 operatively connecting said blower to said suction pan, and a discharge conduit 38. This conduit 38 is provided with any suitable pivotally mounted damper means 40 having a crank shaft 42 whereby the position of the damper may be controlled by any suitable means, such as for instance, by a hereinafter described damper regulating means 44 which is controlled by the pressure of the gas and vapor within the interior of the settling chamber to the end that the pressure of the atmosphere within the blow chamber may at times be maintained at or preferably just below the pressure of the outside atmosphere.

This is done by withdrawing the vapor and air more rapidly than it enters the chamber through its blast inlet opening and then returning to the chamber a constantly regulated proportion of the withdrawn gases through a feed back conduit portion 46 of the blower construction 32. This feed back portion preferably includes a Y-conduit 48 and two rearwardly extending conduits 50 and 52 which are closed at their rear end and are provided with a plurality of spaced apart inlet ports 54 through which the gases are returned to the blow chamber housing 8. Each of these ports is preferably provided with slidably mounted gates or shutters 58 which may be slotted and held in any desired position by a nut and bolt means 60.

The Y-conduit 48 includes a main conduit section 64 and two diverging conduit leg sections 66 and 68. In operation, the fluid stream from the discharge conduit 38 passes downwardly through the main conduit section and is directed first into one of the leg sections and then into the other of the leg sections by means of a damper 70. This damper is preferably mounted on a rearwardly extending crank shaft which is slotted at 72 for the purpose of receiving a rearwardly extending bolt or stud 74 which is rigidly secured to a cross bar 76.

This cross bar forms part of a preferably rectangular, horizontally movable frame member 78 which is provided with two horizontally and forwardly extending flange portions 80 and two vertically and forwardly extending flange portions 82. The horizontally extending flange portions provide means whereby the frame member is movably supported by flanged rollers 84. These rollers are rotatably secured to a stationary frame member 86 which is bolted or secured to the side walls of the blow chamber in any suitable manner.

This stationary frame member is provided with a chain belt and sprocket wheel means 88 which may be driven by any suitable means, such as for instance, a combined motor and variable speed drive means 90. One of the links of the chain belt 87 carries a fixedly secured bracket 92 which rotatably receives the shaft o. a roller 94. This roller alternately engages and moves first one and then the other of the forwardly and vertically extending flange portions 82 in the movable frame member 78.

By referring to Figure 2, it will be seen that the horizontal length of this movable frame member is substantially less than the horizontal distance traveled by the roller as it moves on the chain belt and sprocket wheel means 88. This arrangement, of course, causes the cross bar 76 of the movable frame member to move backward and forward and in doing so it shifts the damper in such a manner as to alternately open and close the passageway through the conduit leg portions 66 and 68 (see Figures 2 and 3).

The main fluid conduit 48 may be provided with any suitable damper means 96 having a crank handle 98 whereby the position of this damper may be adjusted within this conduit when the velocity of the gases flowing through this conduit is excessive. Ordinarily, however, when the damper control means 44 is operating properly, the damper means 96 in the main conduit portion 48 may be left in a fully open position.

The above mentioned damper control means 44 includes a fluid operated power cylinder 100 having a piston 102 which is operatively connected to the crank shaft 42 by an adjustable connecting rod means 104. This rod means may include two rod sections 103 and 105 and a turn buckle 106 whereby the rod means may be lengthened or shortened as may be desired.

As viewed in Figure 2, the right and left end portions of the power cylinder are operatively connected by conduits 111 and 112 respectively to a four-way valve means 113 which is in turn operatively connected by a conduit 114 to the interior of the blow chamber and by a conduit 115 to a fluid pressure supply system (not shown).

This valve means may be of any well known construction which includes a spring balanced floating or flexibly supported diaphragm 116 one side of which is subjected to the pressure of the outside atmosphere and the other side of which is subjected (by means of the conduit 114) to the pressure of the gases inside the blow chamber.

Inasmuch as the details of the construction of four-way valve means of this type are well known to the art, it is thought to require no detailed description other than to state that in operation a slight change of pressure within the blow chamber causes the diaphragm to open and close the valves (not shown) in such a manner that the damper 40 is slightly opened when the pressure in the blow chamber reaches the outside pressure and is slightly closed when the gaseous pressure in the blow chamber drops slightly (say one-tenth of an inch of water) below the outside atmospheric pressure.

The opening of this damper permits a greater proportion of the withdrawn gases to pass into the outer atmosphere and thereby reduces the pressure within the blow chamber. The closing of this damper, of course, forces more of the withdrawn gases to be returned to the blow chamber and thereby increases the gas pressure within this chamber.

From the above, it will be readily understood that the heated gas within the blow chamber may be readily maintained at a pressure just below that of the atmospheric pressure.

It will, of course, be understood that the employment of a damper control means of this type is not indispensable to the operation of the blow chamber of my invention. This control means, however, does provide apparatus whereby the building up of any back pressure in the blow chamber may be prevented. Any substantial back pressure, of course, tends to blow the wool backwardly and out of the chamber through the blast inlet opening 16. A very strong back pressure, therefore, tends to interfere with the blowing operation. The employment of a suitable damper control means not only prevents the building up of this back pressure but it also prevents any reduction of the pressure in the blow chamber to a point which is substantially below the pressure of the outside atmosphere. Any reduction of pressure in the blow chamber to a point below that of the outside atmosphere tends to reduce the temperature in the blow chamber by inducing an excess of air to enter into the chamber through this blast inlet opening.

The maintenance of the proper temperature and pressure conditions in the blow chamber is extremely important in the production of mineral wool felted materials. Should the temperature become excessively low, it becomes very difficult to manufacture an acceptable adhesively treated felted batt.

In the first place, a steam blast is generally employed for the purpose of shredding the molten lava into fibers and, when the temperature in the blow chamber falls substantially below 212° F., the steam rapidly condenses and the condensed water falls upon the felted strip on the conveyor and renders the felted material too heavy and soggy to form the light-weight aeriform batts which are now generally used in the home insulation field.

Another disadvantage of operating the blow chamber at a low temperature is that a suitable molten adhesive (for example melted rosin) is often, if not generally, employed in the industry. The molten adhesive is blown into the blow chamber by the shredding blast in order to obtain a fairly even distribution of the adhesive on the fibers, but, of course, when the temperature in the blow chamber is too low, the molten adhesive quickly chills into small solid particles or lumps which are unable to properly bond the fibers together in the felted batt.

From the foregoing description of the preferred form of my invention, its operation may be thoroughly understood.

As the raw materials are melted in the furnace a stream of lava 116 pours from the spout 118 of the cupola or melting means 2 and falls upon a blast of steam or air issuing from the blast nozzle 120, which forms a part of the shredding means 4. This blast almost immediately disintegrates the molten stream into mineral wool fibers and blows them into gaseous suspension in the blow chamber where, as has been before described, a large proportion of the fibers tend to strike against the side walls and fall on the outer portions of the movable conveyor belt 24.

Now for the purpose of illustration, let us assume that the damper 70 is in the full line position shown in Figure 3. As long as the damper remains in this position, all the gases blown through the Y-conduit 48 are, of course, directed inwardly into the blow chamber through the ports 52 on the side wall 12. As these fibers slide down this side wall or fall adjacent thereto, they are blown inwardly by the spaced apart streams of gas entering the blow chamber through these ports and are drawn downwardly upon the mid-portion of the conveyor belt, by the suction of the blower 34.

When the damper 70 is moved by reason of its engagement with the vertically movable frame member 78 to the dotted line position shown in Figure 3, all the gas or air streams entering the blow chamber through the blower system are, of course, shut off from the side wall 12 and are directed through the side wall 10 to blow the fibers falling adjacent this side wall toward the inner portion of the conveyor belt.

It is thus seen that a part, but not all of the fibers falling adjacent the side walls of this blow chamber are alternately blown away from these side walls and are drawn upon the mid-portion of the conveyor of the blow chamber. This alternate blowing of the fibers—first one way and then the other—provides a most efficient distribution of the fibers on the conveyor in the blow chamber and at the same time helps to deposit the fibers in a crisscross manner on the felted strip which is forming on this conveyor.

It should be noted, however, that the above mentioned feed back arrangement is such that the damper 70 may be held in a vertical position by first stopping the driving mechanism 90 when the roller 94 is approximately midway between the vertically extending flanges 82 of the movable frame member 78 and then moving the movable frame member inwardly until its cross bar 76 and the stud 74 move the damper to its midposition in the main conduit 48. When this damper is thus centrally positioned, the withdrawn air and vapor is, of course, returned to the blow chamber through both of its side walls at the same time.

Should the wool be deposited slightly more on one side of the conveyor than on its other side, the movable frame member 78 may again be moved to correct this condition.

In Figures 5 to 7 inclusive, I have shown a simplified form of my invention which makes use of a cupola or melting furnace 202 and a shredding means 204 which may be similar in construction to the furnace 2 and shredding means 4 of the preferred form of my invention. I also make use of a settling or blow chamber 206 which may be substantially identical to the blow chamber apparatus 6 except that no motor driven driving means is employed to move a damper to shift the air alternately from one side to the other side of the blow chamber and except that the blower construction 232 and its ports are provided in a simplified form.

This blower construction preferably includes a suction pan 226, an intake conduit 236, a blower 234, an exhaust conduit 238, and a damper means 240 which may be identical in construction to the corresponding parts of the blower construction used in the preferred form of my invention. This discharge conduit 238 may be operatively connected to the blow chamber housing 208 by means of a gas feed back conduit 242 and ports 209. This feed back conduit preferably extends across the front of the housing and rearwardly along the outside of the side wall 244 of this blow chamber housing.

The opposite side wall of this blow chamber housing is operatively connected to the conduit 242 by a rearwardly extending feed back conduit 248 having associated therewith ports and shutter means 212 which may be similar in construction to the previously described ports and shutters in the preferred apparatus of my invention. The port and shutter means 209 and 212 on the opposite sides of the blow chamber, however, are not directly opposite each other, but are staggered in relation to each other so that air streams 250 and 252 passing through these ports may blow between each other and not directly against each other (see Figures 6 and 7).

An advantage of employing this staggered arrangement lies in the fact that a more efficient distribution of the wool on the conveyor is obtained because the streams are not flowing directly against each other as they would be were these ports directly opposite each other.

In the accompanying drawings and the foregoing description I have described but two forms of my invention. It will, however, be readily understood that many modified forms may be made which will fall within the scope of the following claims.

I claim:

1. An apparatus of the character described including a settling chamber having a front wall portion, a rear wall portion provided with a fiber inlet open portion, two side wall portions, and a roof portion, and also having a foraminous continuously movable floor portion at the bottom thereof on which said fibers may be deposited; said blow chamber being also provided with a combined fluid blower and conduit construction which is adapted to withdraw the vapors and gases from said chamber through said floor portion and to feed back alternately a portion of said vapors and gases first through one side of said side wall portions and then through the other of said side wall portions to blow the fibers from each of said side wall portions inwardly and directly over said floor portion to provide an increased deposition of said fibers on the central portion of said movable floor portion.

2. Apparatus for forming a layer of mineral wool fibers including a settling chamber for receiving said fibers and having a continuously foraminous surface in the lower portion thereof on which said fibers may be deposited and also having operatively connected thereto a fluid blower and conduit construction adapted to withdraw the vapors and gases in said chamber outwardly through said surface and feed back a portion of said vapors and gases into said chamber through its side walls to blow said fibers inwardly from the side of said chamber to provide a more even distribution of the fibers on said movable surface, said fluid blower and gas conduit construction including a blower, a suction pan operatively connected to the intake side of said blower, a discharge conduit operatively connected to the discharge side of said blower, and being in communication with the atmosphere on the outside of said blower and being operatively connected to the interior of said chamber through each of its side walls for the purpose of feeding back a plurality of streams of said withdrawn vapors and gases inwardly through the said side walls in a manner adapted to provide a more even distribution of the fibers on said foraminous surface.

3. Apparatus for forming a layer of mineral wool fibers including a settling chamber for receiving said fibers and having a continuously foraminous surface in the lower portion thereof on which said fibers may be deposited and also having operatively connected thereto a fluid blower and conduit construction adapted to withdraw the vapors and gases in said chamber outwardly through said surface and feed back a portion of said vapors and gases into said chamber through its side walls to blow said fibers inwardly from the side of said chamber to provide a more even distribution of the fibers on said movable surface, said fluid blower and gas conduit construction including a blower, a suction pan operatively connected to said blower and to said movable surface to withdraw the vapors and gases in said chamber in a manner adapted to trap the fibers in said chamber on said movable surface; said blower being provided with a conduit through which a part of the said vapors and gases may be discharged into the outer atmosphere and being also provided with branch conduit means through which a portion of said withdrawn vapors and gases may be fed back into the interior of said chamber from opposite sides thereof for the purpose herein described.

4. Apparatus for forming a layer of mineral wool fibers including a settling chamber for receiving said fibers and having a continuously foraminous surface in the lower portion thereof on which said fibers may be deposited and also having operatively connected thereto a fluid blower and conduit construction adapted to withdraw the vapors and gases in said chamber outwardly through said surface and feed back a portion of said vapors and gases into said chamber through its side walls to blow said fibers inwardly from the side of said chamber to provide a more even distribution of the fibers on said movable surface, said fluid blower and gas conduit construction including a blower, a suction pan operatively connected to the intake side of said blower, a discharge conduit operatively connected to the discharge side of said blower and being in communication with the atmosphere on the outside of said blower and being provided with and operatively connected by Y-conduit means to the interior of said chamber through its side wall portions for the purpose of feeding back a plurality of streams of said withdrawn vapors and gases inwardly through the side of said chamber in a manner adapted to provide a more even distribution of the fibers on said foraminous surface, said Y-conduit means including a main conduit portion and two branch conduit portions and being provided with a driven movable closure means whereby each of said conduits may be alternately opened and closed.

5. Apparatus for forming a layer of mineral wool fibers including a settling chamber for receiving said fibers and having a continuously foraminous surface in the lower portion thereof on which said fibers may be deposited and also having operatively connected thereto a fluid blower and conduit construction adapted to withdraw the vapors and gases in said chamber outwardly through said surface and feed back a portion of said vapors and gases into said chamber through its side walls to blow said fibers inwardly from the side of said chamber to provide a more even distribution of the fibers on said movable surface, said fluid blower and gas conduit construction including a blower, a suction pan operatively connected to said blower and to said movable surface to withdraw the vapors and gases in said chamber in a manner adapted to trap the fibers in said chamber on said movable surface; said blower being provided with a discharge conduit through which a portion of said vapors and gases may be discharged into the outer atmosphere and being provided with Y-conduit means through which a portion of said withdrawn vapors and gases may be fed back into the interior of said chamber for the purpose herein described, said Y-conduit means including a main conduit portion and two branch conduit portions and being provided with a driven movable closure means whereby each of said conduits may be alternately opened and closed.

6. Apparatus for forming a layer of mineral wool fibers including a settling chamber for receiving said fibers and having a continuously foraminous surface in the lower portion thereof on which said fibers may be deposited and also having operatively connected thereto a fluid blower and conduit construction adapted to withdraw the vapors and gases in said chamber outwardly through said surface and feed back a portion of said vapors and gases into said chamber through its side walls to blow said fibers inwardly from the side of said chamber to provide a more even distribution of the fibers on said movable surface, said fluid blower and gas conduit construction including a blower, a suction pan operatively connected to said blower and to said movable surface to withdraw the vapors and gases in said chamber in a manner adapted to trap the fibers in said chamber on said movable surface; said blower being provided with a conduit through which a part of the said vapors and gases may be discharged into the outer atmosphere and being also provided with branch conduit means through which a portion of said withdrawn vapors and gases may be fed back into the interior of said chamber from opposite sides thereof for the purpose herein described, said discharge conduit being provided with a gas pressure valve operated damper means whereby the flow of the gases into the outside atmosphere through said conduit may be regulated in a manner adapted to decrease or to increase the proportion of the gases withdrawn through said suction pan which are fed back to said settling chamber.

7. Apparatus for forming a layer of mineral wool fibers including a settling chamber for receiving said fibers and having a continuously foraminous surface in the lower portion thereof on which said fibers may be deposited and also having operatively connected thereto a fluid blower and conduit construction adapted to withdraw the vapors and gases in said chamber outwardly through said surface and feed back a portion of said vapors and gases into said chamber through its side walls to blow said fibers inwardly from the side of said chamber to provide a more even distribution of the fibers on said movable surface, said fluid blower and gas conduit construction including a blower, a suction pan operatively connected to the intake side of said blower, a discharge conduit operatively connected to the discharge side of said blower and being in communication with the atmosphere on the outside of said blower and being provided with and operatively connected by Y-conduit means to the interior of said chamber through its side wall portions for the purpose of feeding back a plurality of streams of said withdrawn vapors and gases inwardly through the side of said chamber in a manner adapted to provide a more even distribution of the fibers on said foraminous surface, said Y-conduit means including a main conduit portion and two branch conduit portions and being provided with a driven movable closure means whereby each of said conduits may be alternately opened and closed, said damper means being operatively connected to a fluid pressure actuated damper control means whereby said damper may be opened when the pressure of the vapors and gases in the interior of said chamber reaches the pressure of the outside atmosphere and may be closed when the pressure of said vapors and gases falls slightly below the pressure of the outside atmosphere.

8. The method of manufacturing mineral wool blankets from a descending stream of molten siliceous material suitable for producing mineral wool fibers, said method comprising shredding said stream into fibers, blowing with a gaseous stream the newly formed fibers into gaseous suspension directly above a moving foraminous surface in the direction of the movement of said surface, subjecting the fibers while above said surface to the action of two oppositely directed gaseous streams moving inwardly over and at substantially right angles to the direction of movement of said surface and withdrawing at least a substantial portion of the gas above said surface downwardly through said surface to force said fibers downwardly upon said surface and each other to form a felted mineral wool blanket.

9. The method of manufacturing mineral wool blankets from a descending stream of molten siliceous material suitable for producing mineral wool fibers, said method comprising shredding said stream into fibers, blowing with a gaseous stream the newly formed fibers into gaseous suspension directly above a moving foraminous surface in the direction of the movement of said surface, subjecting the fibers while above said surface to the action of two oppositely directed gaseous streams moving inwardly over and at substantially right angles to the direction of movement of said surface and withdrawing at least a substantial portion of the gas above said surface downwardly through said surface to force said fibers downwardly upon said surface and each other to form a felted mineral wool blanket, each of said two gaseous streams being continuously directed over said surface.

10. The method of manufacturing mineral wool blankets from a descending stream of molten siliceous material suitable for producing mineral wool fibers, said method comprising shredding said stream into fibers, blowing with a gaseous stream the newly formed fibers into gaseous suspension directly above a moving foraminous surface in the direction of the movement of said surface, subjecting the fibers while above said surface to the action of two oppositely directed gaseous streams moving inwardly over and at substantially right angles to the direction of movement of said surface and withdrawing at least a substantial portion of the gas above said surface downwardly through said surface to force said fibers downwardly upon said surface and each other to form a felted mineral wool blanket, said two streams being alternately directed one after the other over said surface.

DANIEL C. DRILL.